(12) United States Patent
Tang (10) Patent No.: US 11,616,612 B2
(45) Date of Patent: *Mar. 28, 2023

(54) METHOD AND DEVICE FOR TRANSMITTING DATA (71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/387,660

(22) Filed: Jul. 28, 2021

(65) Prior Publication Data

US 2021/0359801 A1 Nov. 18, 2021

Related U.S. Application Data (63) Continuation of application No. 16/883,602, filed on May 26, 2020, now Pat. No. 11,146,368, which is a
(Continued)

(51) Int. Cl.
*H04L 5/00* (2006.01)
*H04B 7/02* (2018.01)
(Continued)

(52) U.S. Cl.
CPC ......... *H04L 5/0023* (2013.01); *H04B 7/0413* (2013.01); *H04B 7/0617* (2013.01);
(Continued)

(58) Field of Classification Search
CPC ... H04L 5/0023; H04L 5/0092; H04L 5/0094; H04L 5/0082; H04B 7/0413;
(Continued)

(56) References Cited

U.S. PATENT DOCUMENTS 9,287,958 B2   3/2016   Son et al.
9,426,673 B2   8/2016   Chen et al.
(Continued)

FOREIGN PATENT DOCUMENTS

CN   102307165 A   1/2012
CN   102404854 A   4/2012
(Continued)

OTHER PUBLICATIONS

International Search Report in international application No. PCT/CN2016/084812, dated Feb. 17, 2017.
(Continued)

*Primary Examiner* — Don N Vo
(74) *Attorney, Agent, or Firm* — Ladas & Parry LLP (57) ABSTRACT

Disclosed are a method and device for transmitting data. The method comprises: a transmitting terminal determines in N basic parameter sets a first target basic parameter set of a first beam for transmitting first data, different basic parameter sets of the N basic parameter comprising different frequency-domain base parameter sets and/or different time-domain basic parameter sets, and N being an integer greater than or equal to 2; and the transmitting terminal transmits the first beam on a time-domain resource, a spatial-domain resource, and a frequency-domain resource based on the first target basic parameter set; this can be adapted to requirements of diverse data in a network.

15 Claims, 2 Drawing Sheets

Related U.S. Application Data continuation of application No. 16/306,851, filed as application No. PCT/CN2016/084812 on Jun. 3, 2016, now Pat. No. 10,700,826.

(51) Int. Cl.
| | |
|---|---|
| *H04W 72/04* | (2023.01) |
| *H04W 72/12* | (2023.01) |
| *H04B 7/0413* | (2017.01) |
| *H04B 7/06* | (2006.01) |

(52) U.S. Cl.
CPC .......... *H04L 5/0092* (2013.01); *H04L 5/0094* (2013.01); *H04W 72/04* (2013.01); *H04W 72/12* (2013.01)

(58) Field of Classification Search
CPC .... H04B 7/0617; H04W 72/04; H04W 72/12; H04W 72/046; H04W 16/28; H04W 72/044
USPC ................................................. 375/260, 267
See application file for complete search history.

(56) References Cited

U.S. PATENT DOCUMENTS

| | | | |
|---|---|---|---|
| 10,700,826 B2* | 6/2020 | Tang | .................... H04B 7/0413 |
| 2010/0149961 A1 | 6/2010 | Lee | |
| 2011/0183623 A1 | 7/2011 | Yang | |
| 2012/0076039 A1 | 3/2012 | Kwon | |
| 2013/0156120 A1 | 6/2013 | Josiam et al. | |
| 2014/0056294 A1 | 2/2014 | Branlund et al. | |
| 2014/0302863 A1 | 10/2014 | Chen et al. | |
| 2015/0131560 A1 | 5/2015 | Von Elbwart et al. | |
| 2015/0282167 A1 | 10/2015 | Lahetkangas et al. | |
| 2015/0334762 A1 | 11/2015 | Yang et al. | |
| 2015/0372730 A1 | 12/2015 | Dinan | |
| 2016/0087706 A1 | 3/2016 | Guey et al. | |
| 2016/0087707 A1 | 3/2016 | Guey et al. | |
| 2016/0087765 A1 | 3/2016 | Guey et al. | |
| 2017/0195894 A1 | 7/2017 | Wen et al. | |
| 2017/0245165 A1 | 8/2017 | Onggosanusi et al. | |
| 2017/0331670 A1 | 11/2017 | Parkvall et al. | |
| 2018/0007673 A1 | 1/2018 | Fwu et al. | |
| 2018/0048511 A1 | 2/2018 | Hakola et al. | |
| 2018/0097554 A1 | 4/2018 | Guey et al. | |
| 2018/0279388 A1 | 9/2018 | Miao et al. | |
| 2018/0317128 A1 | 11/2018 | Chun et al. | |
| 2019/0045487 A1 | 2/2019 | You et al. | |
| 2019/0104549 A1 | 4/2019 | Deng et al. | |
| 2020/0296765 A1 | 9/2020 | Kim et al. | |

FOREIGN PATENT DOCUMENTS

| | | |
|---|---|---|
| CN | 104040908 A | 9/2014 |
| CN | 104885377 A | 9/2015 |
| CN | 104904150 A | 9/2015 |
| CN | 105103592 A | 11/2015 |
| CN | 105164930 A | 12/2015 |
| CN | 105338641 A | 2/2016 |
| CN | 105490719 A | 4/2016 |
| CN | 105490796 A | 4/2016 |
| CN | 105637952 A | 6/2016 |
| CN | 104904150 B | 1/2018 |
| JP | 2012505598 A | 3/2012 |
| JP | 2012529193 A | 11/2012 |
| JP | 2015509305 A | 3/2015 |
| JP | 2019523575 A | 8/2019 |
| WO | 2014116090 A1 | 7/2014 |
| WO | 2016058179 A1 | 4/2016 |
| WO | 2016068072 A1 | 5/2016 |

OTHER PUBLICATIONS

Written Opinion of the International Search Authority in international application No. PCT/CN2016/084812, dated Feb. 17, 2017.
CATT, "Discussion on beam-based operation", 3GPP TSG RAN WG1 Meeting #85. R1-164255. Nanjing, China, May 23-27, 2016.
Intel, Ericsson, Nokia, Qualcomm, Samsung, ZTE, NTT DoCoMo, Huawei, Xinwei, CATT; "WF on beam management", 3GPP TSG RAN1 #85, R1-165997, Nanjing, China, May 23-27, 2016, Agenda Item: 7.1.6.
Notice of Allowance of the U.S. Appl. No. 16/306,851, dated Jul. 17, 2019.
First Office Action of the U.S. Appl. No. 16/306,851, dated Oct. 2, 2019.
Notice of Allowance of the U.S. Appl. No. 16/306,851, dated Feb. 20, 2020.
Supplementary European Search Report in European application No. 16903572.2, dated May 22, 2019.
Huawei et al: "Impact of directional transmission on NR numerology for high frequency bands", 3GPP Draft; R1-164381, 3rd Generation Partnership Project (3GPP), Mobile Competence Centre; 650, Route Des Lucioles; F-06921 Sophia-Antipolis Cedex; France, vol. RAN WG1, No. Nanjing, China; May 23, 2016-May 27, 2016 May 15, 2016 (May 15, 2016), XP051096147.
Nokia et al: "Support for Beam Based Common Control Plane", 3GPP Draft; R1-165364, 3rd Generation Partnership Project (3GPP), Mobile Competence Centre; 650, Route Des Lucioles; F-06921 Sophia-Antipolis Cedex; France, vol. RAN WG1, No. Nanjing, P.R. China; May 23, 2016-May 27, 2016 May 13, 2016 (May 13, 2016), XP051096653.
First Office Action of the Japanese application No. 2018-563417, dated Aug. 4, 2020.
"Frame structure supporting flexible parameter allocations", Guangdong OPPO Mobile Telecom; 3GPP TSG-RAN WG1 #85, R1-164472; Nanjing, China, Whole Document.
Huawei, HiSilicon; "Frame structure design considerations for bands above 6 GHz", 3GPP TSG RAN WG1 Meeting #85, R1-164380, Nanjing, China, May 23-27, 2016.
Nokia, Alcatel-Lucent Shanghai Bell; "Subband-wise filtered OFDM for New Radio below 6 GHz", 3GPP TSG-RAN WG1 #85, R1-165014, Nanjing, P.R. China, May 23-27, 2016.
Office Action of the Indian application No. 201817050037, dated Sep. 24, 2020.
Written Opinion of Singaporean application No. 11201810831X, dated Feb. 21, 2020.
Nokia etc, "Support for Beam Based Common Control Plane in 5G New Radio", 3GPP TSG-RAN WG1 #84bis R1-162895, Apr. 15, 2016.
First Office Action of Chinese application No. 201680086404.4, dated Aug. 8, 2019.
Second Office Action of Chinese application No. 201680086404.4, dated Nov. 6, 2019.
Samsung; "Numerology and frame structure for 5G new radio interface: over-6GHz"; 3GPP TSG RAN WG1 Meeting #84bis R1-162180, Apr. 15, 2016.
Notice of Allowance of the Chinese application No. 201680086404.4, dated Feb. 17, 2020.
First Office Action of the Canadian application No. 3044483, dated Jul. 8, 2020.
First Office Action of the Chinese application No. 202010368061.9, dated Nov. 27, 2020.
First Office Action of the Chinese application No. 202010366997.8, dated Nov. 26, 2020.
Second Office Action of the Chinese application No. 202010366997.8, dated Jun. 2, 2021.
First Office Action of the U.S. Appl. No. 16/883,602, dated Dec. 15, 2020.
Notice of Allowance of the U.S. Appl. No. 16/883,602, dated Apr. 20, 2021.
Office Action of the Taiwanese application No. 106117719, dated Jan. 7, 2021.
Correction of Authorization Notice of the U.S. Appl. No. 16/883,602, dated Jul. 28, 2021.

(56) References Cited

OTHER PUBLICATIONS

Correction of Authorization Notice of the U.S. Appl. No. 16/883,602, dated Aug. 27, 2021.
First Office Action of the European application No. 16903572.2, dated Jul. 26, 2021.
First Office Action of the Japanese application No. 2020-200939, dated Nov. 5, 2021.
First Office Action of the Japanese application No. 2020-200957, dated Nov. 5, 2021.
Second Office Action of the Japanese application No. 2020-200957, dated Jun. 7, 2022.
Notice of Allowance of the Japanese application No. 2020-200939, dated Jun. 7, 2022.
Nokia, Alcatel-Lucent Shanghai Bell, "Basic principles for the 5G New Radio access technology", 3GPP TSG-RAN WG1#84b R1-163394, <URL: http://www.3gpp.org/ftp/tsg_ran/WG1_RL1/TSGR1_84b/Docs/R1-163394.zip>, Apr. 18, 2016.
ZTE Corporation, ZTE Microelectronics, "Overview on NR MIMO for above 6GHz", 3GPP TSG-RAN WG1#85 R1-164295, <URL: http://www.3gpp.org/ftp/tsg_ran/WG1_RL1/TSGR1_85/Docs/R1-164295.zip>, May 14, 2016.
Notice of Allowance of the Japanese application No. 2020-200957, dated Nov. 4, 2022.

* cited by examiner

METHOD AND DEVICE FOR TRANSMITTING DATA

CROSS-REFERENCE TO RELATED APPLICATION

This application is a continuation of application Ser. No. 16/883,602 filed on May 26, 2020, which is a continuation of application Ser. No. 16/306,851 filed on Dec. 3, 2018, which is a continuation of an application under 35 U.S.C. 371 of International Application No. PCT/CN20161084812 filed on Jun. 3, 2016, the entire contents of which are incorporated herein by reference.

TECHNICAL FIELD

The disclosure relates to the field of communications, and more particularly to a method and device for transmitting data in the field of communications.

BACKGROUND

Along with development of networks, service requirements keep increasing and service requirement types also keep increasing. In an existing network standard communication protocol, beams with a unified numerology are adopted for data transmission between a network device and a terminal device. For example, the communication protocol specifies a numerology in the Long Term Evolution (LTE) system as follows. A radio frame is 10 ms, a radio frame includes 10 subframes, a subframe includes two time slots, a time slot includes 7 symbols, 12 continuous subcarriers in frequency domain and a time slot in time domain form a Resource Block (RB), a spacing between every two subcarriers is 15 k, a subcarrier in frequency domain and a symbol in time domain are called as a Resource Element (RE) and the like. Along with service diversification, adoption of beams with a specific numerology for data transmission may limit transmission of data of different types.

SUMMARY

Embodiments of the disclosure provide a method and device for transmitting data, which may meet a requirement of data diversity in a network.

According to a first aspect, a method for transmitting data is provided, which may include the following operations. A transmitter determines a first target numerology for transmitting a first beam of a first data from N numerologies, wherein different numerologies from the N numerologies include at least one of different frequency-domain numerologies or different time-domain numerologies. N being an integer more than or equal to 2. The transmitter transmits the first beam on a time-domain resource, a space-domain resource and a frequency-domain resource according to the first target numerology.

In such a manner, different numerologies in the N numerologies include at least one of different frequency-domain numerologies or different time-domain numerologies. The target parameter set for transmitting the first beam in the N numerologies is determined according to the first data, multiple different numerologies may be applied to data of multiple different services, and the N numerologies may meet a requirement of data diversity in a network.

In a first possible implementation mode of the first aspect, different time-frequency domain numerologies may include at least one of: different subcarrier spacings, different basic frequency-domain units, different frequency-domain unit patterns or different subcarrier patterns. Different basic frequency-domain units may include different numbers of continuous subframes. Different frequency-domain unit patterns may be different locations occupied by multiple basic frequency-domain units in a specific bandwidth, and different subcarrier patterns may be different locations and the like of continuous subcarriers in the specific bandwidth.

In combination with the abovementioned possible implementation mode of the first aspect, in a second possible implementation mode of the first aspect, different frequency-domain numerologies may include at least one of: different subframe structures, different basic time-domain units, different Transmission Time Interval (TTI) patterns in a unit period, different subframe patterns in a radio frame, different time slot patterns in a subframe, different Orthogonal Frequency Division Multiplexing (OFDM) symbol patterns in a time slot, different Cyclic Prefix (CP) lengths or different locations occupied by reference symbols in a time-domain unit. Different basic time-domain units may include different numbers of continuous subframes. Different TTI patterns in the unit period may be different locations occupied by TTIs in specific time, different subframe patterns may be different locations occupied by the continuous subframes in the specific time, different time slot patterns may be different locations occupied by time slots in the specific time, and different OFDM symbol patterns may be different locations occupied by OFDM symbols in the specific time.

In combination with the abovementioned possible implementation modes of the first aspect, in a third possible implementation mode of the first aspect, the operation that the transmitter determines the first target numerology for transmitting the first beam of the first data in the N numerologies may include the following actions. The transmitter determines a data type of the first data, and the transmitter determines the first target numerology according to the data type of the first data.

Furthermore, different numerologies may be determined according to different data types. That is, a data type may correspond to a numerology. For example, control-plane data corresponds to a numerology and user-plane data corresponds to another numerology.

In combination with the abovementioned possible implementation modes of the first aspect, in a fourth possible implementation mode of the first aspect, the data type of the first data may correspond to M numerologies, the N numerologies may include the M numerologies, M may be an integer more than or equal to 2 and M may be less than N. The operation that the transmitter determines the first target numerology according to the data type may include the following action. The transmitter determines the M numerologies according to the data type and determines the M numerologies to be the first target numerology.

Specifically, the first data type may correspond to multiple numerologies. For example, the control-plane data may correspond to multiple numerologies and the user-plane data may correspond to multiple numerologies. In such a manner, a channel may correspond to multiple different numerologies. In at least one embodiment, a network device may transmit resource location indication information of multiple different numerologies corresponding to multiple beams in a channel to a terminal device, and the terminal device may determine correspondences between resource locations and beams according to the resource location indication information, such that the terminal device may receive the beams at correct resource locations.

In combination with the abovementioned possible implementation modes of the first aspect, in a fifth possible implementation mode of the first aspect, when the data type of the first data is control-plane data, before the operation that the transmitter transmits the first beam on the time-domain resource, the space-domain resource and the frequency-domain resource according to the first target numerology, the method may further include the following operation. The transmitter processes a third beam according to a beam forming algorithm to obtain the first beam.

In combination with the abovementioned possible implementation modes of the first aspect, in a sixth possible implementation mode of the first aspect, any two numerologies in the N numerologies may include different power calculation manners, and the power calculation manners may include an open loop power calculation manner and a closed loop power calculation manner.

In combination with the abovementioned possible implementation modes of the first aspect, in a seventh possible implementation mode of the first aspect, the method may further include the following operations. The transmitter determines a second target numerology for transmitting a second beam of second data from the N numerologies, wherein a data type of the second data is different from the data type of the first data and the second target numerology is different from the first target numerology. The transmitter transmits the second beam on the time-domain resource, the space-domain resource and the frequency-domain resource according to the second target numerology.

In combination with the abovementioned possible implementation modes of the first aspect, in an eighth possible implementation mode of the first aspect, the first data may be the same as the second data, and before the operation that the transmitter transmits the first beam on the time-domain resource, the space-domain resource and the frequency-domain resource according to the first target numerology, the method may further include the following operation. The transmitter transmits beam resource configuration information to a receiver to enable the receiver to process the first data and the second data according to the beam resource configuration information, wherein the beam resource configuration information is configured to indicate a first resource location occupied by transmitting the first beam of the first data and a second resource location occupied by transmitting the second beam of the second data.

In combination with the abovementioned possible implementation modes of the first aspect, in a ninth possible implementation mode of the first aspect, the first data may be the same as the second data, and before the operation that the transmitter transmits the first beam on the time-domain resource, the space-domain resource and the frequency-domain resource according to the first target numerology, the method may further include the following operation. The transmitter acquires a resource interval. The operation that the transmitter transmits the first beam on the time-domain resource, the space-domain resource and the frequency-domain resource according to the first target numerology may include the following action. The transmitter uses the first target numerology to transmit the first beam on a first frequency-domain resource according to the resource interval. The operation that the transmitter transmits the second beam on the time-domain resource, the space-domain resource and the frequency-domain resource according to the second target numerology may include the following action. The transmitter uses the second target numerology to transmit the second beam on a second frequency-domain resource according to the resource interval, wherein the first frequency-domain resource and the second frequency-domain resource are adjacent resources for transmitting the same data according to the resource interval.

In combination with the abovementioned possible implementation modes of the first aspect, in a tenth possible implementation mode of the first aspect, the first data may be the same as the second data, and before the operation that the transmitter transmits the first beam on the time-domain resource, the space-domain resource and the frequency-domain resource according to the first target numerology, the method may further include the following operation. The transmitter acquires a time interval period. The operation that the transmitter transmits the first beam on the time-domain resource, the space-domain resource and the frequency-domain resource according to the first target numerology may include the following action. The transmitter uses the first target numerology to transmit the first beam at a first moment according to the time interval period. The operation that the transmitter transmits the second beam on the time-domain resource, the space-domain resource and the frequency-domain resource according to the second target numerology may include the following action. The transmitter uses the second target numerology to transmit the second beam at a second moment according to the time interval period, wherein the first moment and the second moment are adjacent moments for transmitting the same data according to the time interval period.

In combination with the abovementioned possible implementation modes of the first aspect, in an eleventh possible implementation mode of the first aspect, the transmitter may be a network device, the receiver may be a terminal device, and before the operation that the transmitter determines the first target numerology for transmitting the first beam of the first data from the N numerologies, the method may further include the following operation. The network device transmits first indication information to the terminal device, wherein the first indication information is configured to indicate a correspondence between the data type and the first target numerology.

In combination with the abovementioned possible implementation modes of the first aspect, in a twelfth possible implementation mode of the first aspect, the transmitter may be a terminal device, the receiver may be a network device, and before the operation that the transmitter determines the first target numerology for transmitting the first beam of the first data from the N numerologies, the method may further include the following operation. The terminal device receives second indication information sent by the network device, wherein the second indication information is configured to indicate the correspondence between the data type and the first target numerology. The operation that the transmitter determines the first target numerology for transmitting the first beam of the first data from the N numerologies may include the following action. The terminal device determines the first target numerology from the N numerologies according to the second indication information.

In combination with the abovementioned possible implementation modes of the first aspect, in a thirteenth possible implementation mode of the first aspect, the transmitter may be a network device, the receiver may be a terminal device, and before the operation that the transmitter transmits the first beam on the time-domain resource, the space-domain resource and the frequency-domain resource according to the first target numerology, the method may further include the following operations. The network device sends resource location indication information to the terminal device, wherein the resource location indication information is configured to indicate a resource location where the first beam is located, and the terminal device receives the resource location indication information sent by the network device. After the operation that the transmitter transmits the first beam on the time-domain resource, the space-domain resource and the frequency-domain resource according to the first target numerology, the method may further include the following operation. The terminal device receives the first beam according to the resource location indication information.

According to a second aspect, a device for transmitting data is provided, which may be configured to execute each process executed by a transmitter in a method for transmitting data in the first aspect or each implementation mode. The device includes a determination module, configured to determine a first target numerology for transmitting a first beam of a first data from N numerologies, wherein different numerologies in the N numerologies includes at least one of different frequency-domain numerologies or different time-domain numerologies, N being an integer more than or equal to 2; and a transmitting module, configured to transmit the first beam on a time-domain resource, a space-domain resource and a frequency-domain resource according to the first target numerology.

According to a third aspect, a network device is provided, which includes the data transmission device of the second aspect.

According to a fourth aspect, a terminal device is provided, which includes the data transmission device of the second aspect.

According to a fifth aspect, a device for transmitting data is provided, which includes a receiver, a transmitter, a memory, a processor and a bus system. The receiver, the transmitter, the memory and the processor are connected through the bus system. The memory is configured to store an instruction. The processor is configured to execute the instruction stored in the memory to control the receiver to receive signals and control the transmitter to transmit signals, and when the processor executes the instruction stored in the memory, such execution enables the processor to execute the method in the first aspect or any possible implementation mode of the first aspect.

According to a sixth aspect, a system chip is provided, which includes an input interface, an output interface, at least one processor and a memory. The processor is configured to execute a code in the memory. When the code is executed, the processor may implement the method for transmitting data in the first aspect and each possible implementation mode.

According to a seventh aspect, a computer-readable storage medium is provided, which is configured to store a computer program. The computer program includes an instruction configured to execute the method in the first aspect or any possible implementation mode of the first aspect.

BRIEF DESCRIPTION OF DRAWINGS

In order to describe the technical solutions of the embodiments of the disclosure more clearly, the drawings required to be used in the embodiments of the disclosure will be simply introduced below. It is apparent that the drawings described below are only some embodiments of the disclosure. Other drawings may further be obtained by those of ordinary skill in the art according to these drawings without creative work.

DETAILED DESCRIPTION

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

It is to be understood that the technical solutions of the embodiments of the disclosure may be applied to various communication systems, for example, a present communication system of a Global System of Mobile Communication (GSM), a Code Division Multiple Access (CDMA) system, a Wideband Code Division Multiple Access (WCDMA) system, a General Packet Radio Service (GPRS), an LTE system, a Universal Mobile Telecommunication System (UMTS) and the like, and are particularly applied to a future 5th-Generation (5G) system.

In the embodiments of the disclosure, a terminal device may also refer to User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in a future 5G network, a terminal device in a future evolved Public Land Mobile Network (PLMN) or the like.

In the embodiments of the disclosure, a network device may be a device configured to communicate with the terminal device. The network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (CRAN) scenario. In alternative embodiments of the disclosure, the network device may be a relay station, an access point, a vehicle-mounted device, a wearable device, a network device in the future 5G network, a network device in the future evolved PLMN or the like.

Figure 1:
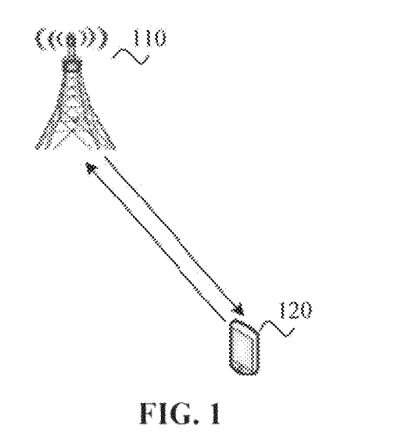
FIG. 1 is a schematic diagram of an application scenario according to an embodiment of the disclosure.

FIG. 1 is a schematic diagram of an application scenario according to an embodiment of the disclosure. A communication system 100 in FIG. 1 may include a network device 110 and a terminal device 120. The network device 110 is configured to provide communication service for the terminal device 120 for access to a core network. The terminal device 120 searches a synchronization signal, broadcast signal and the like sent by the network device 110 to access the network, thereby communicating with the network. Arrows illustrated in FIG. 1 may represent uplink/downlink transmission implemented through a cellular link between the terminal device 120 and the network device 110. In the embodiments of the disclosure, the network device 110 may be a transmitter and may also be a receiver and the terminal device may be a transmitter and may also be a receiver. Different numerologies correspond to different resource mapping manners, so that the embodiments of the disclosure may meet a requirement of data diversity in the network.

Figure 2:
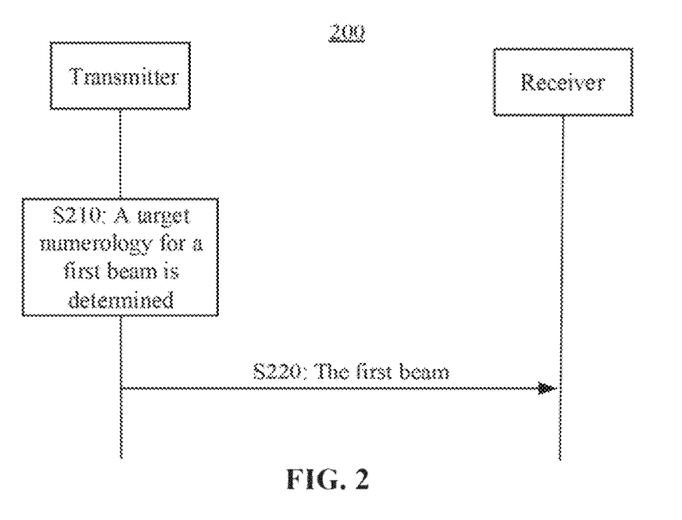
FIG. 2 is a schematic diagram of a method for transmitting data according to an embodiment of the disclosure.

FIG. 2 is a schematic diagram of a method for transmitting data according to an embodiment of the disclosure. As illustrated in FIG. 2, a specific flow of the method for transmitting data 200 includes the following operations.

In S210, a transmitter determines a first target numerology for transmitting a first beam of a first data from N numerologies, wherein different numerologies in the N numerologies includes at least one of different frequency-domain numerologies or different time-domain numerologies, N being an integer more than or equal to 2.

In S220, the transmitter transmits the first beam on a time-domain resource, a space-domain resource and a frequency-domain resource according to the first target numerology.

In at least one embodiment, different frequency-domain numerologies include at least one of: different subcarrier spacings, different basic frequency-domain units, different frequency-domain unit patterns or different subcarrier patterns. Different basic frequency-domain units include different numbers of continuous subframes. Different frequency-domain unit patterns are different locations occupied by multiple basic frequency-domain units in a specific bandwidth, and different subcarrier patterns are different locations and the like of continuous subcarriers in the specific bandwidth.

In at least one embodiment, different time-domain numerologies include at least one of: different subframe structures, different basic time-domain units, different TTI patterns in a unit period, different subframe patterns in a radio frame, different time slot patterns in a subframe, different OFDM symbol patterns in a time slot, different CP lengths or different locations occupied by reference symbols in a time-domain unit. Different basic time-domain units include different numbers of continuous subframes, different TTI patterns in the unit period are different locations occupied by TTIs in specific time, different subframe patterns are different locations occupied by the continuous subframes in the specific time, different time slot patterns are different locations occupied by time slots in the specific time, and different OFDM symbol patterns are different locations occupied by OFDM symbols in the specific time.

Furthermore, in a conventional art, a beam for transmitting data by a transmitter and a receiver corresponds to only one numerology. That is, a time-domain numerology and frequency-domain numerology in the conventional art are fixed as follows: a radio frame is 10 ms, a radio frame includes 10 subframes, a subframe includes two time slots, a time slot includes 7 symbols, 12 continuous subcarriers in frequency domain and a time slot in time domain form an RB, a spacing between every two subcarriers is 15 k, and a subcarrier in frequency domain and a symbol in time domain are called as an RE.

In the embodiments of the disclosure, there may be multiple numerologies for a transmitter and a receiver. That is, a first numerology and second numerology in the multiple numerologies may have the same time-domain numerology but different frequency-domain numerologies, or the first numerology and the second numerology have the same frequency-domain numerology but different time-domain numerologies, or the first numerology and the second numerology have different frequency-domain numerologies and different time-domain numerologies, or the first numerology and the second numerology have different time-domain numerologies, the same frequency-domain numerology and the same space-domain numerology, and the like. There are no limits made thereto in the embodiment of the disclosure.

For convenient understanding, for example, each radio frame of the first numerology includes 5 ms, each radio frame of the second numerology includes 8 ms, and it may be determined that the two time-domain numerologies are different. Each subframe of the first numerology includes 4 time slots, each subframe of the second numerology includes 3 time slots, and it may be determined that the two time-domain numerologies are different. Each time slot of the first numerology includes 12 symbols, each time slot of the second numerology includes 8 symbols, and it may be determined that the two time-domain numerologies are different. A subcarrier spacing of the first numerology is 10 k, a subcarrier spacing of the second numerology is 20 k, and it may be determined that the two frequency-domain numerologies are different. Each basic frequency-domain unit of the first numerology includes 15 continuous subcarriers, each basic frequency-domain unit of the second numerology includes 8 continuous subcarriers, and it may be determined that the two frequency-domain numerologies are different. 10 continuous subcarriers in frequency domain and a time slot in time domain of the first numerology form an RB, 8 continuous subcarriers in frequency domain and two time slots in time domain of the second numerology form an RB, and it may be determined that the two numerologies are different. A subcarrier in frequency domain and two symbols in time domain of the first numerology form an RE, two subcarriers in frequency domain and a symbol in time domain of the second numerology may form an RE, and it may be determined that the two numerologies are different.

For example, different numerologies may also be: different REs, different RBs and different Scheduling Blocks (SBs). For example, there are 8 REs in the first numerology, there are 10 REs in the second numerology, and it may be determined that the first numerology is different from the second numerology. An RB of the first numerology includes 6 REs, an RB of the second numerology includes 10 REs, and it may be determined that the first numerology is different from the second numerology. An SB of the first numerology includes 20 RBs, an SB of the second numerology includes 15 RBs, and it may be determined that the first numerology is different from the second numerology. Therefore, data may be transmitted by taking different REs, RBs or SBs as data units in a data transmission process, and a requirement of data diversity in a network may further be met.

In at least one embodiment, a time-frequency resource mapping manner may also include a time-frequency resource allocation manner. For example, a time slot of the first numerology includes 8 symbols and the first, third and eighth symbols may transmit control-plane data. A time slot of the second numerology includes 12 symbols and the second, ninth and tenth symbols may transmit the control-plane data.

In at least one embodiment, multiple different numerologies may be determined within a specific system time-frequency domain resource. For example, in a system bandwidth of 0~20 Mhz, a first numerology is adopted for a beam sent in a bandwidth of 0~10 Mhz and a second numerology is adopted for a beam sent in a bandwidth of 10~20 Mhz.

It is to be understood that the abovementioned exemplary descriptions of different numerologies are made for convenient understanding only, the numerology may be a numerology and different numerologies generated by changing elements in any time-frequency resource numerology shall fall within the scope of protection of the embodiments of the disclosure.

It is to be understood that the transmitter may be a terminal device and the receiver may be a network device or the transmitter may be a network device and the receiver may be a terminal device. There are no limits made thereto in the embodiment of the disclosure.

In at least one embodiment, different numerologies include different power calculation manners. Different power calculation manners include an open loop power calculation manner and a closed loop power calculation manner.

It is to be understood that closed loop power calculation refers to that the transmitter calculates transmit power of a signal according to feedback information sent by the receiver and open loop power calculation refers to that the transmitter calculates transmit power of a signal according to its own measurement information without a feedback from the receiver. For example, the open loop power manner may refer to that the terminal device is not required to receive an information feedback from the network device and the terminal device determines transmit power of a pilot of the network device according to a system message or estimates downlink loss by measuring power of a presently received pilot. The terminal device may approximate the downlink loss to be uplink loss and calculate uplink transmit power according to an uplink interference signal and the like. The closed loop power manner may refer to that the terminal device dynamically determines transmit power of a signal of the terminal device according to received signal power of the network device.

In at least one embodiment, the operation that the transmitter determines the first target numerology for transmitting the first beam of the first data from the N numerologies includes the following actions. The transmitter determines a data type of the first data, and the transmitter determines the first target numerology according to the data type of the first data. It can be understood that a channel may correspond to one numerology and may also correspond to multiple numerologies.

In at least one embodiment, the data type of the first data corresponds to M numerologies, the N numerologies include the M numerologies, M is an integer more than or equal to 2 and M is less than N. The operation that the transmitter determines the first target numerology according to the data type includes the following action. The transmitter determines the M numerologies according to the data type, and determines the first target numerology in the M numerologies.

Furthermore, different data types may be at least one of control-plane data or user-plane data. For example, when the first data is the control-plane data, a control channel may correspond to multiple different numerologies. When the first data is the user-plane data, a service channel may correspond to multiple different numerologies. Of course, when there are both the user-plane data and the control-plane data, the control channel corresponds to a numerology and the service channel corresponds to another numerology, and the control channel and the service channel may also correspond to the same numerology. The embodiment of the disclosure is not limited thereto.

Furthermore, data types may be defined according to different data. For example, data may be divided into two types, i.e., control-plane data and user-plane data. The control-plane data may correspond to two channels: a Physical Uplink Control Channel (PUCCH) and a Physical Downlink Control Channel (PDCCH). The user-plane data may correspond to two channels: a Physical Downlink Shared Channel (PDSCH) and a Physical Uplink Shared Channel (PUSCH). For another example, for downlink data, channels may be divided according to different data types and, for example, may be: a Physical Broadcast Channel (PBCH), a Physical Downlink Shared Channel (PDSCH), a Physical Control Format Indicator Channel (PCFICH), a PDCCH, a Physical Hybrid Automatic Repeat reQuest (ARQ) Indicator Channel (PHICH), a Physical Multicast Channel (PMCH), a Reference Signal (RS) and a Synchronization Channel (SCH). Division of uplink channels will not be listed herein one by one. A physical channel may correspond to a numerology. A physical channel may also correspond to multiple numerologies. The same physical channel may correspond to multiple different resource locations. Different numerologies may be adopted for different resource locations. Different resource locations may be understood to be the same in time domain and frequency domain but different in space domain, may also be understood to be the same in time domain and space domain but different in frequency domain, and may further be understood to be the same in frequency domain and space domain but different in time domain. That is, two resource locations different in at least one of the time domain, the frequency domain or the space domain may be defined to be different. In at least one embodiment, different physical channels may correspond to different numerologies. Correspondences between channels and numerologies are not limited in the embodiments of the disclosure.

In at least one embodiment, when the data type of the first data is control-plane data, before the operation that the transmitter transmits the first beam on the time-domain resource, the space-domain resource and the frequency-domain resource according to the first target numerology, the method further includes that: the transmitter processes a third beam according to a beam forming algorithm to obtain the first beam.

Specifically, in an antenna technology such as Multiple-input Multiple-Output (MIMO), beam forming processing may be performed on a third beam on a control channel to generate a first directional beam and the like. In at least one embodiment, beam forming processing may be performed on data sent on a data channel and beam forming processing may also be performed on data sent on the control channel. The embodiment of the disclosure is not limited thereto.

In at least one embodiment, the method further includes the following operations. The transmitter determines a second target numerology for transmitting a second beam of second data from the N numerologies, wherein a data type of the second data is different from the data type of the first data and the second target numerology is different from the first target numerology. The transmitter transmits the second beam on the time-domain resource, the space-domain resource and the frequency-domain resource according to the second target numerology.

It is to be understood that the first data and the second data may be the same data and may also be different data. That is, the first beam and the second beam may transmit the same data. Herein, the same data may be the same service data or the same control data, different data may be different service data or different control data, or the first data may be service data and the second data may be control data. There are no limits made thereto in the embodiments of the disclosure.

In at least one embodiment, the first data is the same as the second data. Before the operation that the transmitter transmits the first beam on the time-domain resource, the space-domain resource and the frequency-domain resource according to the first target numerology, the method further includes the following operation. The transmitter transmits beam resource configuration information to a receiver to enable the receiver to process the first data and the second data according to the beam resource configuration information, wherein the beam resource configuration information is configured to indicate a first resource location occupied by transmitting the first beam of the first data and a second resource location occupied by transmitting the second beam of the second data.

Specifically, when the transmitter is a network device and the receiver is a terminal device, the network device may transmit the beam resource configuration information to the terminal device, wherein the beam resource configuration information is configured to indicate the resource locations occupied by the beams transmitting the same data. The terminal device, when receiving the beam resource configuration information, may determine two different resource locations of the beams transmitting the same data. In such a manner, combined gain calculation may be performed on the data received at the two different resource locations.

In at least one embodiment, the first data is the same as the second data. Before the operation that the transmitter transmits the first beam on the time-domain resource, the space-domain resource and the frequency-domain resource according to the first target numerology, the method further includes the following operation. The transmitter acquires a time interval period. The operation that the transmitter transmits the first beam on the time-domain resource, the space-domain resource and the frequency-domain resource according to the first target numerology includes that: the transmitter uses the first target numerology to transmit the first beam at a first moment according to the time interval period. The operation that the transmitter transmits the second beam on the time-domain resource, the space-domain resource and the frequency-domain resource according to the second target numerology may include that: the transmitter uses the second target numerology to transmit the second beam at a second moment according to the time interval period. The first moment and the second moment are adjacent moments for transmitting the same data according to the time interval period. The first target numerology is different from the second target numerology.

In at least one embodiment, the first data is the same as the second data. Before the operation that the transmitter transmits the first beam on the time-domain resource, the space-domain resource and the frequency-domain resource according to the first target numerology, the method further includes the following operation. The transmitter acquires a resource interval. The operation that the transmitter transmits the first beam on the time-domain resource, the space-domain resource and the frequency-domain resource according to the first target numerology includes that: the transmitter uses the first target numerology to transmit the first beam on a first frequency-domain resource according to the resource interval. The operation that the transmitter transmits the second beam on the time-domain resource, the space-domain resource and the frequency-domain resource according to the second target numerology includes that: the transmitter uses the second target numerology to transmit the second beam on a second frequency-domain resource according to the resource interval. The first frequency-domain resource and the second frequency-domain resource are adjacent resources for transmitting the same data according to the resource interval.

Specifically, a period interval may be set to determine that the transmitter transmits the same data to the receiver in each period interval. The period interval may be a time interval, and in such a manner, the terminal device receives the same data at two different moments through two different beams. The resource interval may also be set to determine that the transmitter transmits the same data to the receiver in each resource interval. The resource interval may be a frequency-domain resource interval, and in such a manner, the receiver receives the same data at two different resource locations through two different beams. The receiver, when receiving the same data, may store and merge the same data to obtain a combined gain of the data of different beams. It is to be understood that when the transmitter is a network device and the receiver is a terminal device, the time interval period and the resource interval may refer to that the network device transmits indication information to the terminal device to indicate that the terminal device transmits the same data in the time interval period or the resource interval. In an alternative example, it may be specified through a network protocol that the same data is sent in the time interval period or the resource interval. Of course, different time interval periods or resource intervals are set for different terminal devices and network devices. During a practical application, the time interval period and the resource interval may be variable and are determined according to a practical requirement or specified according to the protocol. The embodiment of the disclosure is not limited thereto.

In at least one embodiment, the transmitter is a network device and the receiver is a terminal device. Before the operation that the transmitter transmits the first beam on the time-domain resource, the space-domain resource and the frequency-domain resource according to the first target numerology, the method further includes the following operations. The network device transmits resource location indication information to the terminal device, wherein the resource location indication information is configured to indicate a resource location where the first beam is located. The terminal device receives the resource location indication information sent by the network device, and receives the first beam according to the resource location indication information.

Specifically, the terminal device, when receiving the first beam, does not know the resource location occupied by the first beam, and the network device is required to transmit the resource location indication information of the first beam to the terminal device. The terminal device determines the resource location occupied by the first beam according to the resource location indication information and receives the first beam at the resource location. In at least one embodiment, a physical channel may transmit multiple beams and the multiple beams may correspond to multiple numerologies. When the network device is required to transmit multiple beams to the terminal device, it is necessary to notify resource locations occupied by the multiple beams to the terminal device through the resource location indication information. In such a manner, it may be determined that the terminal device receives the beams at the correct resource locations.

In at least one embodiment, the transmitter is a network device and the receiver is a terminal device. Before the operation that the transmitter determines the first target numerology for transmitting the first beam of the first data from the N numerologies, the method further includes the following operation. The network device transmits first indication information to the terminal device, wherein the first indication information is configured to indicate a correspondence between the data type and the first target numerology.

In at least one embodiment, the transmitter is a terminal device and the receiver is a network device. Before the operation that the transmitter determines the first target numerology for transmitting the first beam of the first data from the N numerologies, the method further includes the following operation. The terminal device receives second indication information sent by the network device, wherein the second indication information is configured to indicate the correspondence between the data type and the first target numerology. The operation that the transmitter determines the first target numerology for transmitting the first beam of the first data from the N numerologies includes that: the terminal device determines the first target numerology in the N numerologies according to the second indication information. Herein, the second indication information and the first indication information may also be the same information.

Specifically, when the transmitter is the network device and the receiver is the terminal device, the network device may transmit the first indication information to the terminal device to indicate a correspondence between a data type and a numerology. For example, the first indication information may indicate a correspondence between a first beam and a numerology and may also indicate the correspondence between the data type and the numerology. The first indication information may also be a combination identifier of the numerology corresponding to the first beam. The network device transmits the combination identifier to the terminal device and the terminal device may determine the numerology for receiving the first beam of the data.

In at least one embodiment, when the first data is user-plane data, the terminal device may receive third indication information sent by the network device on the control channel, wherein the third indication information is configured to indicate the numerology used for transmitting the beam of the first data. Specifically, the terminal device, when receiving the third indication information, determines to adopt the first beam to transmit the first data on the data channel.

In at least one embodiment, the network device may transmit the first beam to the terminal device according to a first correspondence. That is, the first correspondence may be a correspondence between N numerologies and N beams. That is, the beams are in one-to-one correspondence with the numerologies. The first correspondence may be specified by the network protocol, or the network device may configure the first correspondence and transmit the first correspondence to the terminal device. There are no limits made thereto in the embodiments of the disclosure. In at least one embodiment, a period T may be set. T includes four time periods, i.e., T0, T1, T2 and T3 respectively. Numerologies for beams in the four time periods may be: N0, N1, N2, N3, N4, N5, N6, N7, N8 and N9. When the numerology for the beam in T0 is N4, the numerology for the beam in T1 may be N5, the numerology for the beam in T2 may be N6 and the numerology for the beam in T3 may be N7. Therefore, the numerologies for the beams may sequentially be selected in a time division manner.

In at least one embodiment, a numerology may be a set formed by at least one of a time-domain numerology, a space-domain numerology, a time-domain numerology or a power calculation manner. Each of the three numerologies corresponding to the time-domain numerology, the space-domain numerology and the frequency-domain numerology optionally exists. If the numerology does not include a certain numerology, the numerology is vacant. In at least one embodiment, when the numerology is vacant, it may also be indicated that an existing numerology may be adopted for the first beam. For example, the first beam may be sent according to a numerology predetermined in the protocol. The network device may transmit the combination identifier of the numerology to the terminal device. For example, the combination identifier may be: a combination identifier in the first column in Table 1. As an example, a correspondence between a combination identifier and each of a frequency-domain resource combination identifier, a time-domain resource combination identifier, a space-domain resource combination identifier and a power calculation manner may be simply described in Table 1. The first column in Table 1 may represent combination identifiers. The combination identifiers may be, for example, 1, 2, 3, . . . i, wherein i is a natural number. Each combination identifier corresponds to a specific combination of numerologies. In at least one embodiment, the combination identifier may be determined by the network device. The network device may transmit the combination identifier to the terminal device. It may also be specified according to the network protocol. The embodiment of the disclosure is not limited thereto.

The second column in Table 1 may represent the combination identifier of the frequency-domain numerology. For example, D1, D2, D3, . . . Di in the second column represent i frequency-domain numerologies. Of course, at least two in D1, D2, D3, . . . Di may be the same or different. The embodiments of the disclosure are not limited thereto.

The third column in Table 1 may represent the combination identifier of the time-domain numerology. For example, E1, E2, E3, . . . E4 in the third column represent i time-domain numerologies. Of course, at least two in E1, E2, E3, . . . E4 may be the same or different. The embodiments of the disclosure are not limited thereto. A time-domain resource may include at least one of a specific time period or a specific time, a time-domain resource period and the like.

The fourth column in Table 1 may represent the combination identifier of the numerology. For example, F1, F2, F3, . . . Fi represent i space-domain numerologies. Of course, at least two in F1, F2, F3 . . . . Fi may be the same or different. The embodiments of the disclosure are not limited thereto.

The fifth column in Table 1 may represent the power calculation manner. For example, G1 in the fifth column represents adoption of the open loop power calculation manner and G2 represents adoption of the closed loop power calculation manner.

TABLE 1

| Combination identifier | Combination identifier of frequency-domain numerology | Combination identifier of time-domain numerology | Combination identifier of space-domain numerology | Power calculation manner |
|---|---|---|---|---|
| 1 | D1 | E1 | F1 | G1 |
| 2 | D2 | E2 | F2 | G1 |

TABLE 1-continued

| Combination identifier | Combination identifier of frequency-domain numerology | Combination identifier of time-domain numerology | Combination identifier of space-domain numerology | Power calculation manner |
|---|---|---|---|---|
| 3 | D3 | E3 | F3 | G2 |
| 4 | D4 | E4 | F4 | G2 |
| ... | ... | ... | ... | ... |
| i | Di | Ei | Fi | G1 |

For example, when it is determined that an identifier number of a combination identifier of the numerology for the first beam is 1, a frequency-domain numerology for the first beam is D1, a time-domain numerology is E1, a space-domain numerology is F1 and the open loop power calculation manner is adopted to transmit the first data. A specific combination identifier is adopted to represent a combination of numerologies for multiple resources.

In at least one embodiment, based on the numerologies represented by the combination identifier in Table 1, the same combination identifier may also be determined for different physical channels, that is, the same numerology is adopted for different physical channels. Different combination identifiers may be determined for the same physical channel, that is, multiple different numerologies may be determined for the same physical channel. Different combination identifiers may be determined for different physical channels, that is, multiple different numerologies may be determined for different physical channels.

The method for transmitting data according to the embodiments of the disclosure is described above in combination with FIG. 2 in detail and a device for transmitting data according to the embodiments of the disclosure will be described below in combination with FIG. 3 to FIG. 5 in detail. It is to be understood that the device for transmitting data of the embodiments of the disclosure may execute various methods in the abovementioned embodiments of the disclosure. That is, the following specific execution process of the device may refer to the corresponding process in the method embodiments.

Figure 3:
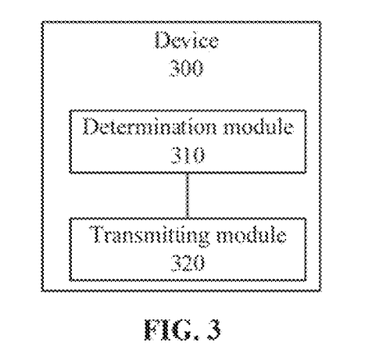
FIG. 3 is a schematic block diagram of a device for transmitting data according to an embodiment of the disclosure.

FIG. 3 is a schematic diagram of a device 300 for transmitting data according to an embodiment of the disclosure. The device 300 includes a determination module 310 and a transmitting module 320.

The determination module 310 is configured to determine a first target numerology for transmitting a first beam of a first data from N numerologies, wherein different numerologies in the N numerologies include at least one of different frequency-domain numerologies or different time-domain numerologies. N may be an integer more than or equal to 2.

The transmitting module 320 is configured to transmit the first beam on a time-domain resource, a space-domain resource and a frequency-domain resource according to the first target numerology.

In at least one embodiment, different time-frequency domain numerologies include at least one of: different subcarrier spacings, different basic frequency-domain units, different frequency-domain unit patterns or different subcarrier patterns.

In at least one embodiment, the device is characterized in that different frequency-frequency domain numerologies include at least one of: different subframe structures, different basic time-domain units, different TTI patterns in a unit period, different subframe patterns in a radio frame, different time slot patterns in a subframe, different OFDM symbol patterns in a time slot, different CP lengths or different locations occupied by reference symbols in a basic time-domain unit.

In at least one embodiment, the determination module 310 may specifically be configured to determine a data type of the first data and determine the first target numerology according to the data type of the first data.

In at least one embodiment, the data type of the first data corresponds to M numerologies, the N numerologies include the M numerologies, M is an integer more than or equal to 2 and M is less than N. The determination module 310 may specifically be configured to determine the M numerologies according to the data type and determine the first target numerology in the M numerologies.

In at least one embodiment, when the data type of the first data is control-plane data, the determination module 310 may further be configured to, before the first beam is sent on the time-domain resource, the space-domain resource and the frequency-domain resource according to the first target numerology, process a third beam according to a beam forming algorithm to obtain the first beam.

In at least one embodiment, two different numerologies in the N numerologies may include different power calculation manners and different power calculation manners may include an open loop power calculation manner and a closed loop power calculation manner.

In at least one embodiment, the determination module 310 may further be configured to determine a second target numerology for transmitting a second beam of second data from the N numerologies, wherein a data type of the second data is different from the data type of the first data and the second target numerology is different from the first target numerology. The transmitting module 320 may further be configured to transmit the second beam on the time-domain resource, the space-domain resource and the frequency-domain resource according to the second target numerology.

In at least one embodiment, the first data may be the same as the second data. The transmitting module 320 may further be configured to, before the first beam is sent on the time-domain resource, the space-domain resource and the frequency-domain resource according to the first target numerology, transmit beam resource configuration information to a receiver to enable the receiver to process the first data and the second data according to the beam resource configuration information, wherein the beam resource configuration information may be configured to indicate a first resource location occupied by transmitting the first beam of the first data and a second resource location occupied by transmitting the second beam of the second data.

In at least one embodiment, the first data may be the same as the second data. The device may further include a first acquisition module. The first acquisition module may be configured to, before the first beam is sent on the time-domain resource, the space-domain resource and the frequency-domain resource according to the first target numerology, acquire a time interval period. The transmitting module 320 may further be configured to use the first target numerology to transmit the first beam at a first moment according to the time interval period. The transmitting module 320 may further be configured to use the second target numerology to transmit the second beam at a second moment according to the time interval period. The first moment and the second moment are adjacent moments for transmitting the same data according to the time interval period.

In at least one embodiment, the first data may be the same as the second data. The device may further include a second acquisition module. The second acquisition module may be configured to, before the first beam is sent on the time-domain resource, the space-domain resource and the frequency-domain resource according to the first target numerology, acquire a resource interval. The transmitting module 320 may further be configured to use the first target numerology to transmit the first beam on a first frequency-domain resource according to the resource interval. The transmitting module 320 may further be configured to use the second target numerology to transmit the second beam on a second frequency-domain resource according to the resource interval. The first frequency-domain resource and the second frequency-domain resource are adjacent resources for transmitting the same data according to the resource interval.

In at least one embodiment, the device is a network device and the receiver is a terminal device. The transmitting module 320 may further be configured to, before the first target numerology for transmitting the first beam of the first data in the N numerologies is determined, transmit first indication information to the terminal device, wherein the first indication information is configured to indicate a correspondence between the data type and the first target numerology.

In at least one embodiment, the device is the terminal device and the receiver is the network device. The device may further include a receiving module. The receiving module may be configured to, before the first target numerology for transmitting the first beam of the first data in the N numerologies is determined, receive second indication information sent by the network device, wherein the second indication information is configured to indicate the correspondence between the data type and the first target numerology. The determination module 310 may further be configured to determine the first target numerology in the N numerologies according to the second indication information. Herein, the second indication information is the same as or different from the first indication information. There are no limits made thereto in the embodiments of the disclosure.

In at least one embodiment, the device is the network device and the receiver is the terminal device. The transmitting module 320 may further be configured to, before the first beam is sent on the time-domain resource, the space-domain resource and the frequency-domain resource according to the first target numerology, transmit resource location indication information to the terminal device, wherein the resource location indication information is configured to indicate a resource location where the first beam is located.

It is to be understood that the device 300 described herein is embodied in form of functional module. A term "module" mentioned herein may refer to an Application Specific Integrated Circuit (ASIC), an electronic circuit, a processor (for example, a shared processor, a dedicated processor or a group processor) and memory configured to execute one or more software or firmware programs, a merged logic circuit and/or another proper component supporting the described functions. In at least one example, those skilled in the art may know that the device 30) may specifically be the network device in the abovementioned embodiments and the device 300 may be configured to execute each flow and/or operation corresponding to the network device in the abovementioned method embodiments, which will not be elaborated herein for avoiding repetitions.

When the device 300 is the network device, a communication system for transmitting data of the embodiments of the disclosure may include the device 300 and the terminal device. When the device 300 is the terminal device, the communication system for transmitting data of the embodiments of the disclosure may include the device 300 and the network device.

Figure 4:
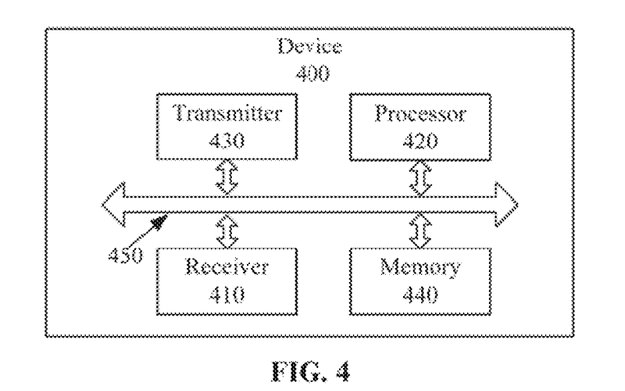
FIG. 4 is a schematic block diagram of a device for transmitting data according to an embodiment of the disclosure.

FIG. 4 illustrates a device 400 for transmitting data according to an embodiment of the disclosure. The device 400 may be a network device 110 or terminal device 120 in the method 200. The device 400 includes a receiver 410, a processor 420, a transmitter 430, a memory 440 and a bus system 450. The receiver 410, the processor 420, the transmitter 430 and the memory 440 are connected through the bus system 450. The memory 440 is configured to store an instruction. The processor 420 is configured to execute the instruction stored in the memory 440 to control the receiver 410 to receive a signal and control the transmitter 430 to transmit an instruction.

The processor 420 is configured to determine a first target numerology for transmitting a first beam of first data from N numerologies, wherein different numerologies in the N numerologies include at least one of different frequency-domain numerologies or different time-domain numerologies, N being an integer more than or equal to 2. The transmitter 430 is configured to transmit the first beam on a time-domain resource, a space-domain resource and a frequency-domain resource according to the first target numerology.

It is to be understood that the device 400 may specifically be the transmitter in the abovementioned embodiments and may be configured to execute each flow and/or operation corresponding to the transmitter in the abovementioned method embodiments. In at least one embodiment, the memory 440 may include a Read-Only Memory (ROM) and a Random Access Memory (RAM) and provides an instruction and data for the processor 420. A part of the memory may further include a nonvolatile RAM. For example, the memory may further store information of a device type. The processor 420 may be configured to execute the instruction stored in the memory. When the processor executes the instruction, the processor may execute each operation corresponding to the transmitter in the abovementioned method embodiments.

Figure 5:
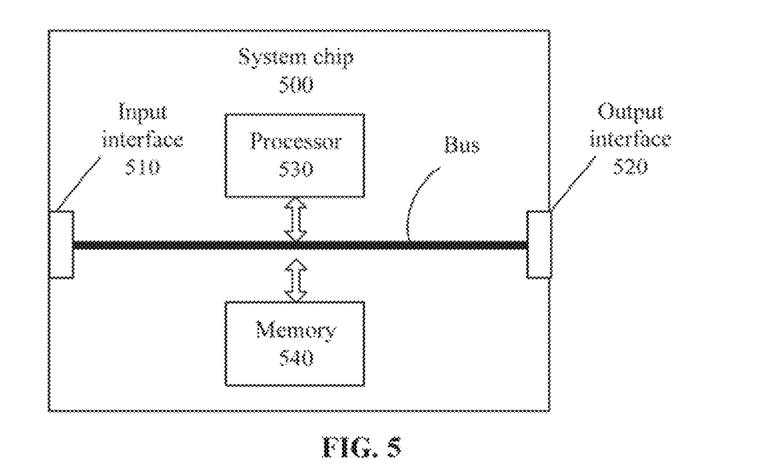
FIG. 5 is a schematic structure diagram of a system chip for transmitting data according to an embodiment of the disclosure.

FIG. 5 is a schematic structure diagram of a data transmission system chip according to an embodiment of the disclosure. The system chip 500 of FIG. 5 includes an input interface 510, an output interface 520, at least one processor 530 and a memory 540. The input interface 510, the output interface 520, the processor 530 and the memory 540 are connected through a bus. The processor 530 is configured to execute a code in the memory 540. When the code is executed, the processor 530 implements the method executed by the transmitter in FIG. 2.

The processor 530 is configured to determine a first target numerology for transmitting a first beam of first data from N numerologies, wherein different numerologies in the N numerologies include at least one of different frequency-domain numerologies or different time-domain numerologies, N being an integer more than or equal to 2. The output interface 520 is configured to transmit the first beam on a time-domain resource, a space-domain resource and a frequency-domain resource according to the first target numerology.

It is to be understood that the device and system chip of the embodiments of the disclosure described in FIG. 4 and FIG. 5 may implement each operation of the abovementioned method and will not be elaborated herein for avoiding repetitions.

It is to be understood that in the embodiments of the disclosure, the processor may be a Central Processing Unit (CPU) and the processor may also be another universal processor, a Digital Signal Processor (DSP), an ASIC, a Field-Programmable Gate Array (FPGA) or another programmable logic device, discrete gate or transistor logic device and discrete hardware component and the like. The universal processor may be a microprocessor or the processor may also be any conventional processor and the like.

In an implementation process, each operation of the method may be completed by an integrated logic circuit of hardware in the processor or an instruction in a software form. The operations of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a Programmable ROM (PROM) or Electrically PROM (EPROM) and a register. The storage medium is located in the memory, and the processor reads the instruction in the memory, and completes the operations of the method in combination with hardware. No more detailed descriptions will be made herein to avoid repetitions.

It should be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

In addition, terms "system" and "network" in the disclosure may usually be exchanged in the disclosure. In the disclosure, a term "and/or" is only an association relationship describing associated objects and represents that three relationships may exist. For example, A and/or B may represent three conditions: i.e., independent existence of A, existence of both A and B and independent existence of B. In addition, a character "/" in the disclosure usually represents that previous and next associated objects form an "or" relationship.

It is to be understood that in the embodiments of the disclosure, "B corresponding to A" represents that B is associated with A and B may be determined according to A. It is also to be understood that determining B according to A does not mean that B is determined only according to A and B may also be determined according to A and/or other information.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for transmitting data, comprising:
  receiving, by a terminal device, first indication information sent by a network device, wherein the first indication information is used to indicate a correspondence between a data type and a first target numerology;
  determining, by the terminal device, a data type of a first data;
  determining, by the terminal device, a first target numerology for transmitting a first beam of the first data from N numerologies according to the data type of the first data and the correspondence between the data type and the first target numerology, wherein different numerologies in the N numerologies comprise at least one of different frequency-domain numerologies or different time-domain numerologies, N being an integer more than or equal to 2; and
  transmitting, by the terminal device, the first beam on a time-domain resource, a space-domain resource and a frequency-domain resource according to the first target numerology.

2. The method of claim 1, wherein different time-frequency domain numerologies comprise at least one of:
different subcarrier spacings,
different basic frequency-domain units,
different frequency-domain unit patterns or
different subcarrier patterns.

3. The method of claim 1, further comprising:
determining, by the terminal device, a second target numerology for transmitting a second beam of a second data from the N numerologies, wherein a data type of the second data is different from the data type of the first data and the second target numerology is different from the first target numerology; and
transmitting, by the terminal device, the second beam on the time-domain resource, the space-domain resource and the frequency-domain resource according to the second target numerology.

4. The method of claim 1, further comprising:
determining, by the terminal device, a second target numerology for transmitting a second beam of a second data from the N numerologies, wherein the first data is the same as the second data; and
before transmitting, by the terminal device, the first beam on the time-domain resource, the space-domain resource and the frequency-domain resource according to the first target numerology, the method further comprises:
transmitting, by the terminal device, beam resource configuration information to the network device to enable the network device to process the first data and the second data according to the beam resource configuration information, wherein the beam resource configuration information is configured to indicate a first resource location occupied by transmitting the first beam of the first data and a second resource location occupied by transmitting the second beam of the second data.

5. The method of claim 1, further comprising:
determining, by the terminal device, a second target numerology, for transmitting a second beam of a second data from the N numerologies, wherein the first data is the same as the second data; and
transmitting, by the terminal device, the second beam on a time-domain resource, a space-domain resource and a frequency-domain resource according to the second target numerology;
before transmitting, by the terminal device, the first beam on the time-domain resource, the space-domain resource and the frequency-domain resource according to the first target numerology, the method further comprises:
acquiring, by the terminal device, a resource interval;
wherein transmitting, by the terminal device, the first beam on the time-domain resource, the space-domain resource and the frequency-domain resource according to the first target numerology comprises:
using, by the terminal device, the first target numerology to transmit the first beam on a first frequency-domain resource according to the resource interval; and
wherein transmitting, by the terminal device, the second beam on the time-domain resource, the space-domain resource and the frequency-domain resource according to the second target numerology comprises:
using, by the terminal device, the second target numerology to transmit the second beam on a second frequency-domain resource according to the resource interval, wherein the first frequency-domain resource and the second frequency-domain resource are adjacent resources for transmitting the same data according to the resource interval.

6. The method of claim 1, wherein a data type of the first data comprises at least one of control-plane data or user-plane data.

7. The method of claim 1, wherein data of different data types correspond to different target numerologies.

8. A method for receiving data, comprising:
sending, by a network device, first indication information to a terminal device, wherein the first indication information is used to indicate a correspondence between a data type and a first target numerology and is used for the terminal device to determine the first target numerology for transmitting a first beam of a first data from N numerologies according to a data type of the first data and the correspondence between the data type and the first target numerology, different numerologies in the N numerologies comprise at least one of different frequency-domain numerologies or different time-domain numerologies, N being an integer more than or equal to 2;
receiving, by the network device, the first beam on a time-domain resource, a space-domain resource and a frequency-domain resource according to the first target numerology.

9. A terminal device for transmitting data, comprising a transmitter, a receiver and a processor,
the receiver is configured to receive first indication information sent by a network device, wherein the first indication information is used to indicate a correspondence between a data type and a first target numerology;
the processor is configured to determine a data type of a first data and determine a first target numerology for transmitting a first beam of the first data from N numerologies according to the data type of the first data and the correspondence between the data type and the first target numerology, wherein different numerologies in the N numerologies comprise at least one of different frequency-domain numerologies or different time-domain numerologies, N being an integer more than or equal to 2; and
the transmitter is configured to transmit the first beam on a time-domain resource, a space-domain resource and a frequency-domain resource according to the first target numerology.

10. The terminal device of claim 9, wherein different frequency domain numerologies comprise at least one of:
different subcarrier spacings,
different basic frequency-domain units,
different frequency-domain unit patterns or
different subcarrier patterns.

11. The terminal device of claim 9, wherein the processor is further configured to:
determine a second target numerology for transmitting a second beam of a second data from the N numerologies, wherein a data type of the second data is different from the data type of the first data and the second target numerology is different from the first target numerology; and
wherein the transmitter is further configured to transmit the second beam on the time-domain resource, the space-domain resource and the frequency-domain resource according to the second target numerology.

12. The terminal device of claim 9, wherein the processor is further configured to:
   determine a second target numerology for transmitting a second beam of a second data from the N numerologies, wherein the first data is the same as the second data; and
   wherein the transmitter is further configured to, before the first beam is transmitted on the time-domain resource, the space-domain resource and the frequency-domain resource according to the first target numerology, transmit:
   beam resource configuration information to the network device to enable the network device to process the first data and the second data according to the beam resource configuration information, wherein the beam resource configuration information is configured to indicate a first resource location occupied by transmitting the first beam of the first data and a second resource location occupied by transmitting the second beam of the second data.

13. The terminal device of claim 9, wherein the processor is further configured to determine a second target numerology for transmitting a second beam of a second data from the N numerologies, wherein the first data is the same as the second data; and the transmitter is further configured to transmit the second beam on a time-domain resource, a space-domain resource and a frequency-domain resource according to the second target numerology,
   wherein the processor is further configured to acquire a resource interval before the first beam is transmitted on the time-domain resource, the space-domain resource and the frequency-domain resource according to the first target numerology;
   wherein the transmitter is further configured to use the first target numerology to transmit the first beam on a first frequency-domain resource according to the resource interval; and use the second target numerology to transmit the second beam on a second frequency-dovain resource according to the resource interval, wherein the first frequency-domain resource and the second frequency-domain resource are adjacent resources for transmitting the same data according to the resource interval.

14. The terminal device of claim 9, wherein a data type of the first data comprises at least one of control-plane data or user-plane data.

15. The terminal device of claim 9, wherein data of different data types correspond to different target numerologies.

* * * * *